United States Patent
Fingerhut (10) Patent No.: US 6,636,489 B1
(45) Date of Patent: Oct. 21, 2003

(54) WIRELESS MANAGEMENT SYSTEM AND A METHOD FOR AN AUTOMATED OVER-THE-AIR MANAGING PROCESS FOR WIRELESS COMMUNICATION DEVICE

(75) Inventor: Howard Fingerhut, Mendham, NJ (US)

(73) Assignee: Bell South Wireless Data. L.P., Woodbridge, NJ (US)

( * ) Notice: Subject to any disclaimer, the term of this patent is extended or adjusted under 35 U.S.C. 154(b) by 0 days.

(21) Appl. No.: 08/963,446

(22) Filed: Nov. 3, 1997

(51) Int. Cl.[7] .............................................. H04Q 7/00
(52) U.S. Cl. ....................................... 370/328; 455/419
(58) Field of Search ................................. 455/411, 410, 455/426, 419, 31.3, 418, 420, 425; 370/462, 328

(56) References Cited

U.S. PATENT DOCUMENTS

| | | | |
|---|---|---|---|
| 4,253,087 A | 2/1981 | Saal | 340/147 |
| 4,761,646 A | 8/1988 | Choquet et al. | 340/852.52 |
| 4,825,204 A | 4/1989 | Nakamura | 340/825.52 |
| 4,825,448 A | 4/1989 | Critchlow et al. | 375/8 |
| 4,956,852 A | 9/1990 | Hodge | 375/8 |
| 4,996,524 A | 2/1991 | Tojima | 340/825.02 |
| 5,077,790 A | * 12/1991 | D'Amico et al. | 380/23 |
| 5,204,669 A | 4/1993 | Dorfe et al. | 340/825.52 |
| 5,373,288 A | 12/1994 | Blahut | 340/825.08 |
| 5,386,455 A | * 1/1995 | Cooper | 455/419 |
| 5,410,543 A | 4/1995 | Seitz et al. | 370/85.13 |
| 5,440,541 A | 8/1995 | Iida et al. | 370/60.1 |
| 5,465,251 A | 11/1995 | Judd et al. | 370/54 |
| 5,511,065 A | 4/1996 | Yonehara | 370/17 |
| 5,530,896 A | 6/1996 | Gilbert | 395/829 |
| 5,537,610 A | 7/1996 | Mauger et al. | 379/58 |
| 5,539,390 A | 7/1996 | Nagano et al. | 340/825.07 |
| 5,559,503 A | 9/1996 | Blahut | 340/825.08 |
| 5,586,269 A | 12/1996 | Kubo | 395/250 |
| 5,603,084 A | * 2/1997 | Henry, Jr. et al. | 455/419 |
| 5,608,871 A | 3/1997 | Murono | 395/200.02 |
| 5,654,985 A | 8/1997 | Crayford et al. | 375/211 |
| 5,731,757 A | * 3/1998 | Layson, Jr. | 340/573.1 |
| 5,754,953 A | * 5/1998 | Briancon et al. | 455/418 |
| 5,774,804 A | * 6/1998 | Williams | 455/419 |
| 5,794,142 A | * 8/1998 | Vanttila | 455/419 |
| 5,828,956 A | * 10/1998 | Shirai | 455/411 |
| 5,835,858 A | * 11/1998 | Vaihoja et al. | 455/419 |
| 5,875,394 A | * 2/1999 | Daly et al. | 455/411 |
| 5,943,425 A | * 8/1999 | Mizikovsky | 380/25 |
| 5,956,636 A | * 9/1999 | Lipsit | 455/411 |

FOREIGN PATENT DOCUMENTS

| | | |
|---|---|---|
| EP | 0 435 052 A2 | 7/1991 |
| EP | 0 679 040 | 10/1995 |
| EP | 0 757 502 | 2/1997 |
| EP | 0 778 716 A2 | 6/1997 |
| EP | 0 779 759 | 6/1997 |

OTHER PUBLICATIONS

"CDMA Development Group Defines Instant Activation Process First of Many Specs to be Developed," Sep. 28, 1994, 2 pages.
"Over–the–Air Activation Overview," 1 page.
"Over–the–Air Activation Stage 3," San Francisco, CA, Apr. 3–7, 1995,pp. 1–35. ©1995 TIA.
"Amended Draft Text of Over–the–Air Activation of Mobile Stations in Wideband Spread Spectrum Cellular Systems," PN–XXXX, V.0.05, Apr. 4, 1995,.60 pages.
"Over–the–Air Activation Feature—Stage 1 Description," Jun. 8, 1995,pp. 1–22.
"Over–the–Air Activation Stage 2," San Francisco, CA, Apr. 3–7, 1995,pp. 1–52, ©1995 TIA.

* cited by examiner

*Primary Examiner*—Kenneth Vanderpuye
(74) *Attorney, Agent, or Firm*—Merchant & Gould (57) ABSTRACT

In a wireless communication system including a base station, a network and a control unit, a generic network address is initially stored in a communication device, the communication device being activated onto the network utilizing the generic network address. If service is to be provided to the communication device, a control unit of the network provides a unique network address for storage in the communication device for use in subsequent communication between the communication device and the network.

26 Claims, 5 Drawing Sheets

Fig. 1

STEP 1 — POWER ON

STEP 2 — INITIATION OF THE CONTACT WITH THE NETWORK

STEP 3 — PROMPT FOR THE ARP

STEP 4 — THE ARP IS FORMED

STEP 5 — SENDING THE ARP TO THE NETWORK

WIRELESS MANAGEMENT SYSTEM AND A METHOD FOR AN AUTOMATED OVER-THE-AIR MANAGING PROCESS FOR WIRELESS COMMUNICATION DEVICE

FIELD OF INVENTION

The present invention relates to a method and a system for activating a wireless device. More particularly, the present invention provides for an automated process for managing an over-the-air activation, deactivation, or change of service for a two-way wireless communication device, e.g., a radio modem such as a pager or a wireless phone. The over-the-air operations are performed via a wireless subscription management network.

BACKGROUND INFORMATION

A conventional wireless electronic communication device, for example a radio modem such as a two-way pager, is traditionally put into service for a customer through a service provider. The service provider may be a different entity than a network provider, i.e., the entity providing the wireless communications infrastructure, such as a MOBITEX network, the de facto international standard for two-way wireless data communications. As is known in the art, a basic MOBITEX network includes base stations, local switches, national switches, and a network control center.

The activation process for a particular communication device generally requires that, once the service provider determines that the customer should be authorized for service, the service provider contacts the network provider. The determination if and how to activate the communication device can be based on a number of factors, such as user provided information, for example, the user's credit report, service area, type of services requested and price option. The service provider then provides to the network provider, for example, the serial number assigned by the manufacturer of the communication device and a unique network address of the device (UNA), also assigned by the manufacturer. The network provider then activates the device.

The activation process itself is performed manually, i.e., the required user information must be provided to and then processed by the service provider and subsequently forwarded to the network provider. Further, the activation process is not generally performed in real-time. The activation process also presumes a number of different operations that are performed by the manufacturer at the time the device is manufactured, such as the manual programing of a unique network address (UNA) for each communication device. Thus, the activation process can be labor intensive and costly.

Every conventional wireless device has a unique network address, e.g., a unique phone number or equivalent identifier so that signals can be directed to a particular device. As indicated above, the manufacturer must assign this unique network address to the device at the time of assembly. Even if the communication device, such as a radio modem, is not activated, the device is assigned, at the time of manufacture, a unique network address from a limited pool of such addresses. The manual assignment of a unique address at the time of manufacture increases the cost of manufacturing each wireless device, and requires that careful records be kept of network addresses used to avoid any duplication.

UNAs assigned to manufacturers will become increasingly difficult to manage as the volume of units required to fulfill market requirements grows. The current manual process of multiple services will become cost prohibitive. Assigning UNAs begins with the allocation of a range of UNAs to a radio modem manufacturer. The manufacturer then programs a UNA into each radio modem and records the UNA and manufacturer serial number pair. An electronic copy of a list with the UNAs is provided to the network operator who will provide service for the devices. Since there are different operators and various ranges assigned to each operator, activation of each device is typically a manual and error prone process. Similarly, changing the UNA from a local to regional or international UNA, or to the address range of another operator also requires a manual change process. For example, user and operator exchange of account and device information, address, and manufacture number, are done via fax, voice call, or E-mail. The information is then manually entered into an account management system. Such a process is not only costly and time consuming, but also yields a relatively high number of errors that also need to be corrected via manual trouble shooting and resolution procedures. For high volume, low margin markets, such as paging, the current method of operation is cost prohibitive.

Further, the finite address space and international numbering plan needed to support MOBITEX creates an added level of complexity, cost, and security risk resulting in the proliferation of radio modem programming tools. This is another problem that must be addressed. Since UNA space is limited, controlled allocation and reprogramming of UNAs is necessary. The variety of tools and skills required to program radio modems also represents a sales impediment in addition to the security risk and potential for error. Further, limiting the access to tools that permit reprogramming of UNAs increases system security and decreases the rate of errors while improving customer satisfaction and convenience.

SUMMARY OF THE INVENTION

In accordance with the present invention, there is provided a wireless subscription management system and a method for an automated, over-the-air process of managing and administering wireless communication devices. Further, the present invention minimizes manual process and data entry error in addition to simplifying the distribution, production and programming of wireless devices.

DETAILED DESCRIPTION OF THE INVENTION

Figure 1:
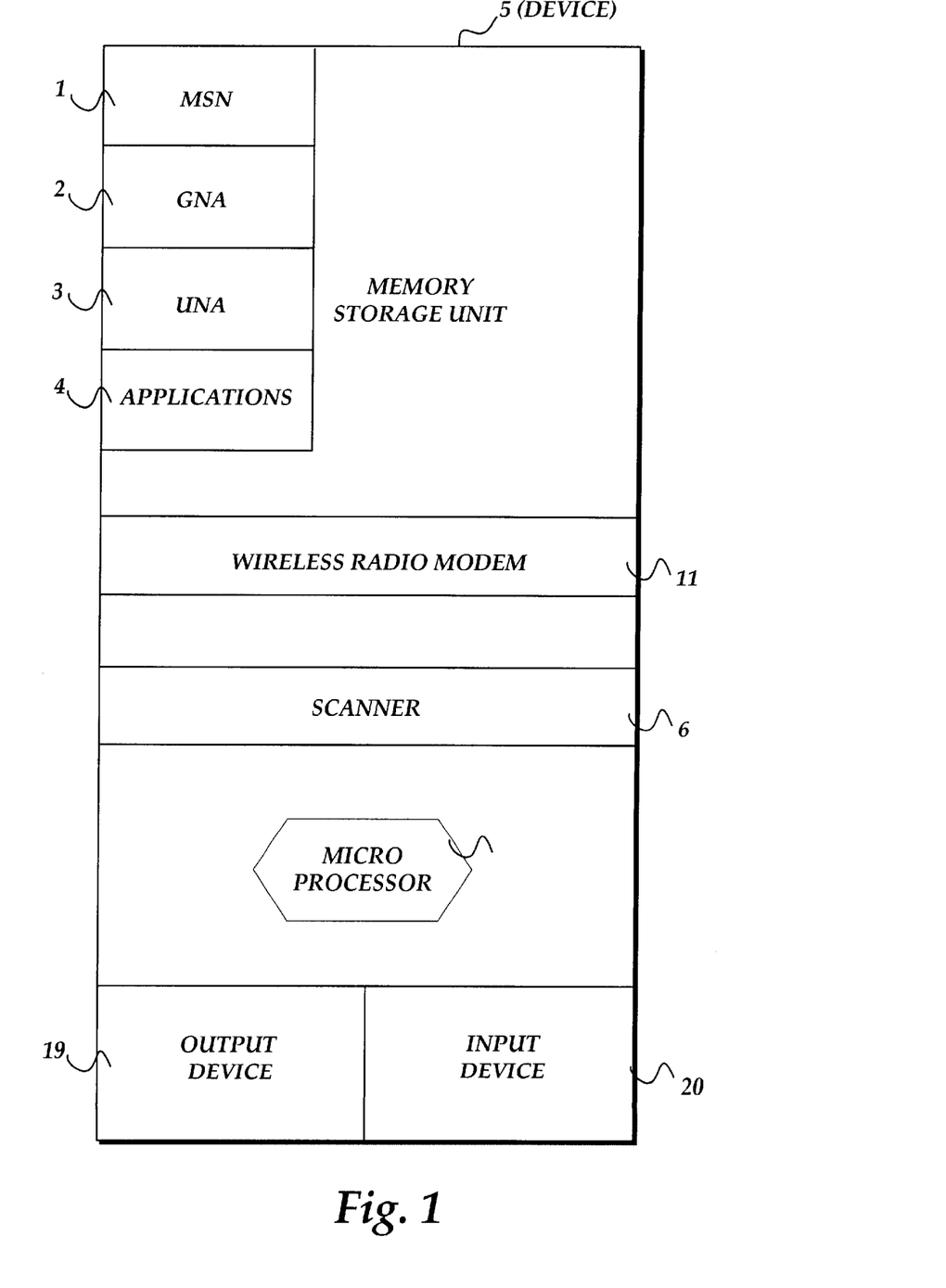
FIG. 1 shows an exemplary embodiment of a wireless communication device according to the present invention.

FIG. 1 shows a two-way wireless communication device 5 according to an embodiment of the present invention. The device 5 includes a memory storage unit 13. The memory storage unit 13 includes, for example, a location 1 into which a permanently assigned manufacturer serial number (MSN) is stored, and a location 3 for a programmable unique network address (UNA). According to the present invention, the UNA is not inserted into the location 3 at the time of manufacture of the device 5. Instead, the UNA is inserted during the OAA process according to the present invention described in detail below. In addition, the memory storage unit 13 has a location 4 where, for example, an optional software application that initiates the OAA process, is stored. The software application may also be in another device that may communicate with the device 5. At a minimum, the device 5 contains a software application that will respond to an activation request and corresponding network responses. Further, a location 2 of the memory storage unit 13 stores a generic network address (GNA), for example, assigned by the manufacturer of the device 5 at the time of manufacture.

The device 5 also has a scanning circuit 6 that searches for a control signal from the nearest base station in a wireless network 12, and a wireless radio modem 11 that transmits and receives data to and from the network 12. In addition, the device 5 has an output device 19, e.g., LCD screen, and an input device 20, e.g., a numerical pad, keyboard and/or voice recognition device. The device 5 is also equipped with a microprocessor 21 which controls operation of the device 5.

The device 5 has, for example, two modes of operation: (1) an OAA process or pre-activated mode; and (2) an operational process or user mode.

Figure 2:
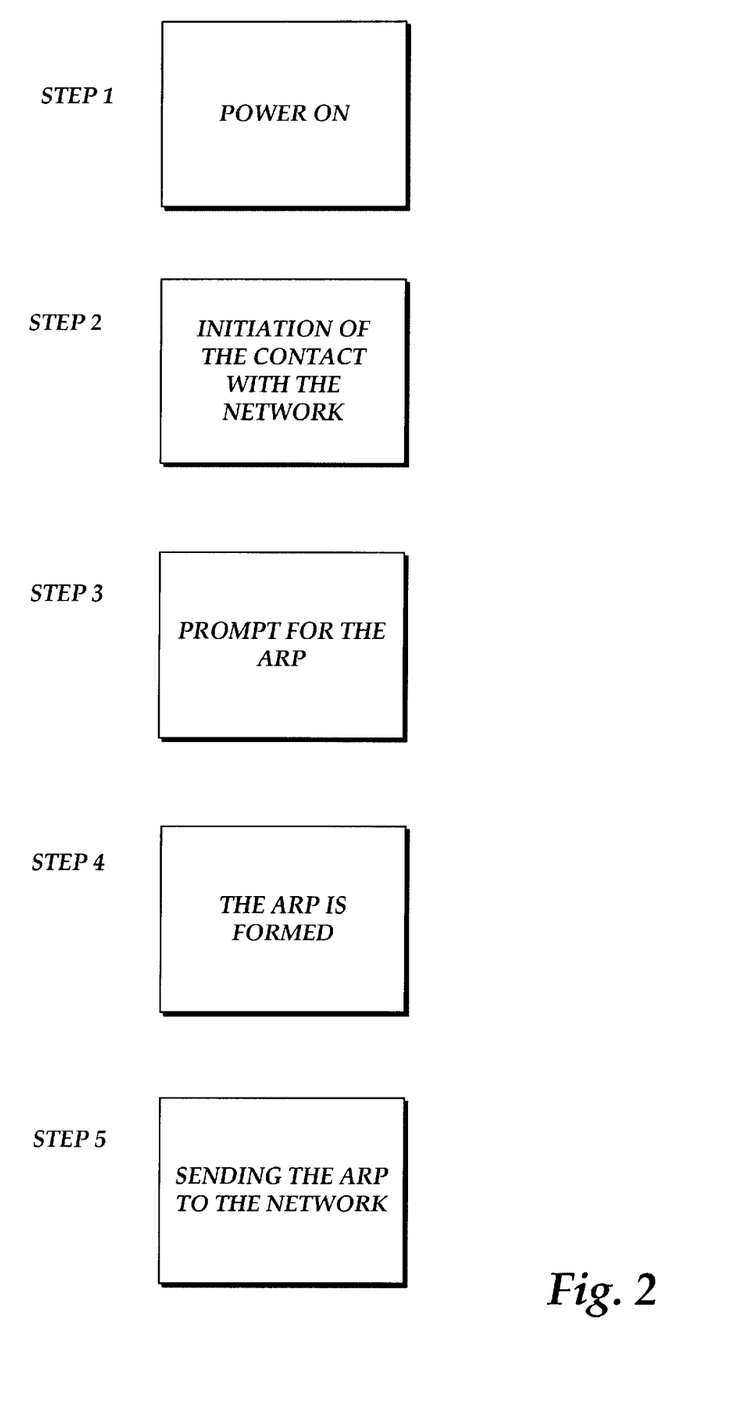
FIG. 2 shows a block diagram of an exemplary implementation of an over-the-air activation (OAA) process for the wireless communication device illustrated in FIG. 1.

FIG. 2 shows an exemplary initiation sequence of the OAA process mode according to an embodiment of the present invention. The initiation sequence of the OAA process includes, for example, five steps. The first step is to turn on the power to the device 5. The device 5 automatically determines that the UNA is not present in the location 3 of the memory storage unit 13 and initiates the OAA process, which is stored, for example, as an application program in location 4 of the memory storage unit 13. The second step is to establish contact with the wireless subscription network 12. The scanning circuit 6, which is, for example, preprogrammed at the time of assembly, or by the service provider 16 at the time of sale to the user, initiates a search for a usable communication channel of the network 12.

Once contact with the network 12 is established, the device 5, during the third step of the initiation sequence, prompts the user for the information required to activate the device 5 via, for example, the application software stored in location 4 of the memory storage unit 13. During the fourth step of the initiation sequence, the initial request for activation of the device 5 from the network 12 is formed via an activation-request packet (ARP) 7 generated by the application program. The fifth step is to send the ARP 7 from the device 5 to the network 12 via the wireless modem 11. Alternatively, steps 3 and 4 can be performed simultaneously or prior to step 2.

Figure 3:
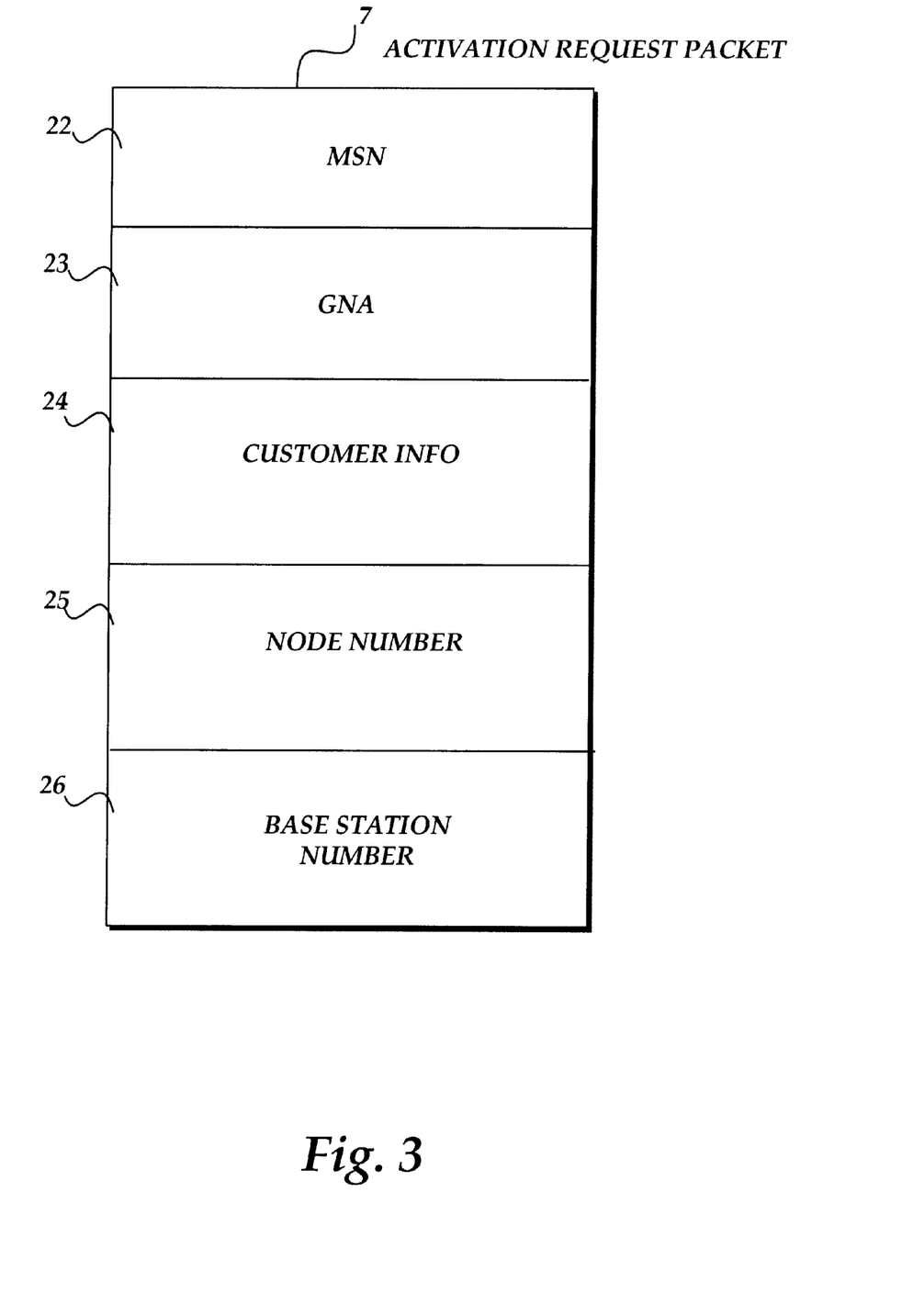
FIG. 3 shows the exemplary contents of an activation request message according to an exemplary embodiment of the present invention.

An exemplary format of ARP 7 is illustrated in FIG. 3. The ARP 7 utilizes, for example, packet data technology which, as is known in the art, carries finite or variable length blocks of data. These blocks of data are typically limited in size by packet switching infrastructure, for example, 512 bytes of information. Longer messages may be subdivided into multiple packets and reassembled automatically at the receiving end, as is also known in the art. Each packet of data is not necessarily a complete message, but rather contains up to 512 bytes of data. Each packet can be sent through different channels and is put together as a whole message upon receipt by the network 12. The use of packet data technology process makes it difficult for unauthorized personnel to determine where a specific message begins and ends. Such a scheme also presents a highly efficient and reliable method to handle data.

As shown in FIG. 3, the ARP 7 includes, for example, a plurality of information fields. For example, a field 22 is for the MSN which may include such information as a model number and the identity of the manufacturer of the device 5 as well as a date of manufacture. In addition, the ARP 7 has a field 23 for the GNA and a user information field 24. The user information field 24 may contain, for example, personal information relating to the user, an area of desired coverage of the device 5, a method of payment, and/or a level of service. Further, the ARP 7 has a field 25 for optional network routing information so that the network can efficiently route response messages to the original point. The ARP 7 also has a field 26 for identifying information of the base station 10 that received the ARP 7 from the device 5.

All information fields in the ARP 7 can be encrypted. Each field of the ARP 7 may have, for example, a different encryption scheme, or, if desired, no encryption. This allows a further enhancement to the security of the device 5. Such a security scheme provides an advantage to the service provider 16 because, for example, the user information field 24, which information is only required by the service provider 16, may be encrypted using a different encryption scheme than the network provider 28 information, and thus can be kept secret from the network provider 28.

Figure 4:
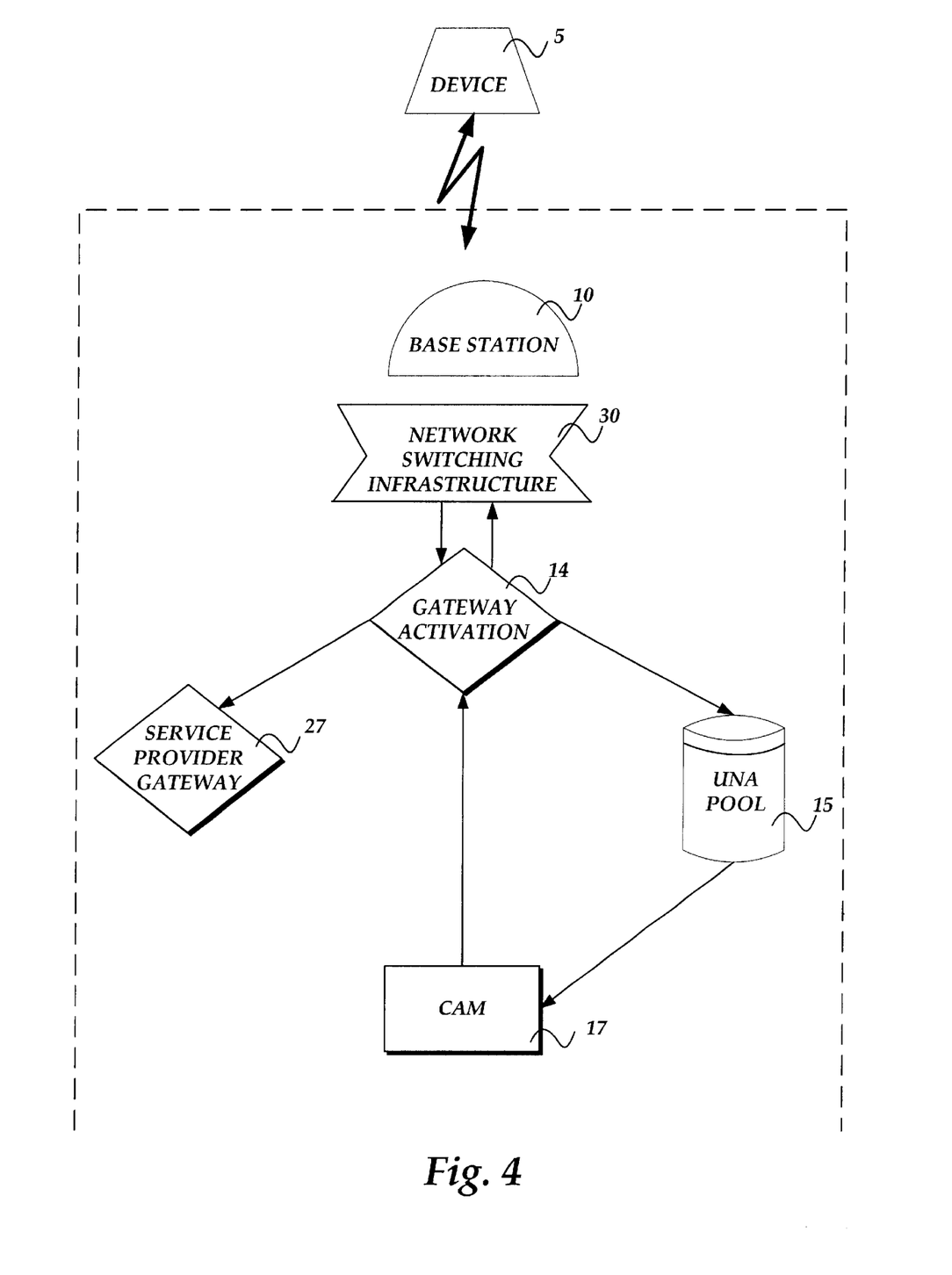
FIG. 4 shows a data flow in the wireless subscription management network according to an exemplary embodiment of the present invention.

FIG. 4 shows the flow of data in the network 12. When the ARP 7 is transmitted by the device 5 via the modem 11 to the network 12, the base station 10 which receives the ARP 7 inserts a node number (e.g., routing information) into the field 25 and optionally inserts a node number and base station number into fields 25 and 26, correspondingly. The network 12 decrypts the ARP 7, except for the personal information field 8. If the MSN and the GNA of the ARP 7 match the MSN and the GNA provided by the manufacturer of the device 5 and stored in a database of network 12, then the network 12 accepts the ARP 7. Subsequently, the network 12 routes the ARP 7 via a network switching infrastructure 30, such as a MOBITEX network, to a gateway 14 which facilitates the automated process of assigning a UNA to the device 5 and activating the device on the network 12. The gateway 14 sends an authorization request to the service provider 16 for verification.

The verification can be done, for example, via a service provider gateway 27 connected to the gateway 14. The service provider gateway 27, like the gateway 14, is, for example, a processor based device, such as a computer or a network server, that may contain an authentication program developed by the service provider 16 which includes the authentication criteria of the service provider 16. The service provider 16 evaluates the ARP 7 and if it is approved, authorization is sent to the gateway 14. At the time the ARP 7 is received, the gateway 14 selects a UNA from a UNA pool 15, which is stored, for example, in a UNA database in the network 12, and provides the UNA to the service provider gateway 27. Thus, if the service provider gateway 27 determines that the authentication request is approved, the UNA is already available to be provided to the device 5. Then, the network 12 Informs a Client Account Management database (CAM) 17 that the UNA is being assigned to the client. The CAM 17 keeps track of all records of assigned and available UNAs.

However, if the authentication request is denied, however, then the gateway 14 is so informed and the UNA can be returned to the UNA pool 15. If the service is authenticated for the device 5, then the UNA is inserted into the field 24 of an activation response packet 18.

Figure 5:
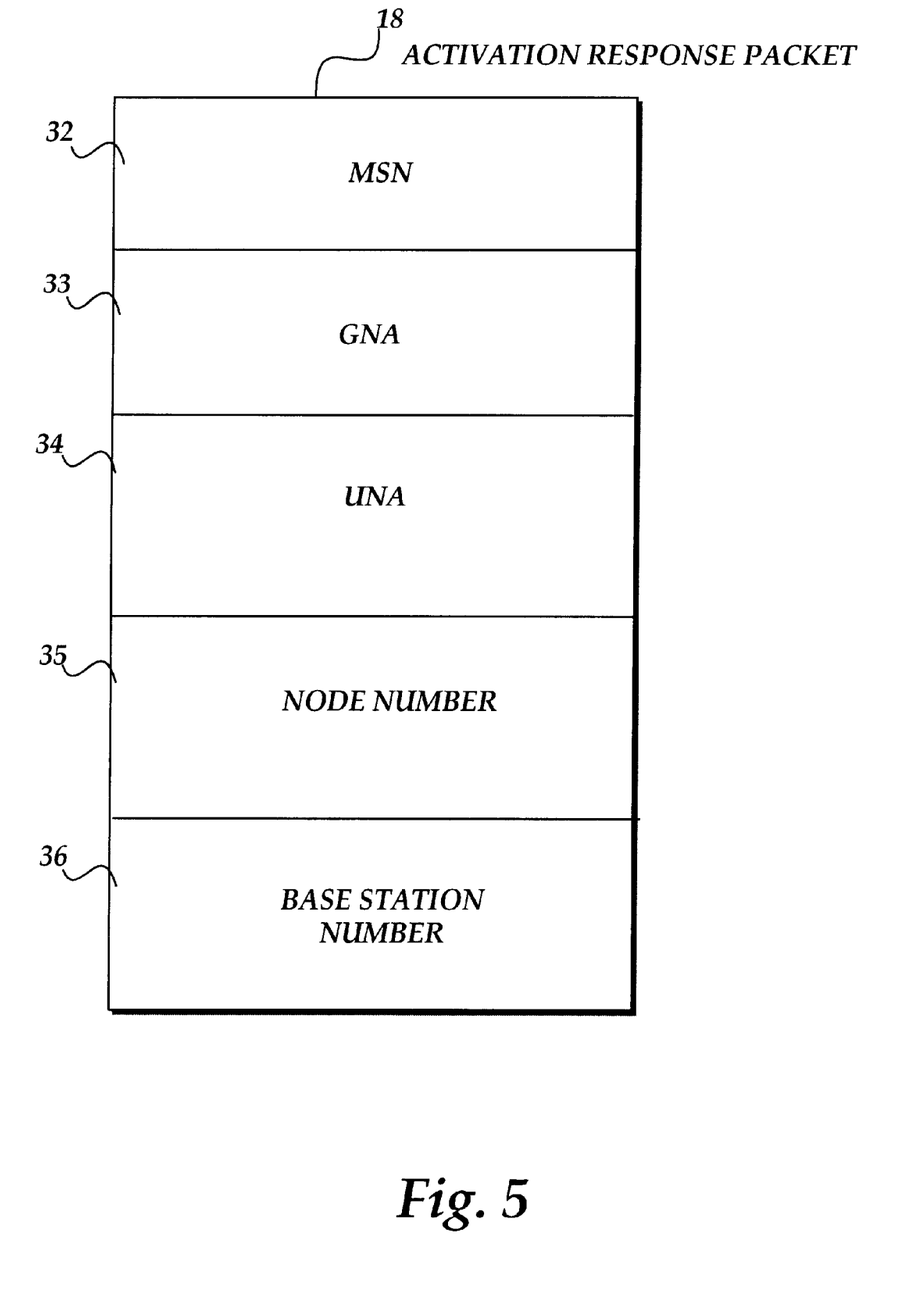
FIG. 5 shows the exemplary contents of an activation response message according to an exemplary embodiment of the present invention.

The response packet 18 is generated by the gateway 14, and includes, for example, as shown in FIG. 5, a field 32 for the MSN, a field 33 for the GNA, a field 34 for the UNA, a field 35 for the node number, and a field 36 for the base station number. The present invention has an advantage over existing systems that it also provides an opportunity for the service providers 16 to insert into the response activation packet 18, for example, a welcome message, user instruction, and marketing information.

Each field of the response packet 18, as in the ARP 7, can be encrypted utilizing different encryption algorithms. Such a scheme allows the service provider 16 to limit the access of others to certain fields of the response packet 18. The network provider 28, on the other hand, may limit access to the field 34 where the UNA is stored. The present invention by the use of a GNA initially programmed into the communication device 5 and by the subsequent over-the-air provision of a UNA at the time of activation of the device 5 or other selected time, further allows the service provider 16 and the network provider 28 to have full control of activating, authenticating and authorizing the devices 5. This eliminates the need for specific configuration tools that might be acquired or used by unauthorized personnel.

Another advantage of the present invention is that the response packet 18 does not have to be broadcast nationally. For example, during the OAA process according to the present invention, the user stays in the same geographical location from which the user sent the ARP 7 until the device 5 is activated which takes, for example two minutes. In a conventional pager system, however, the location of a particular communication device is not known and thus a signal for a particular communication device must be transmitted throughout the entire coverage area of the wireless communications network. Further, a conventional pager system would only provide one way communication from the network to the communicating device and thus the network has no way of knowing where a particular communication device is located and therefore must broadcast a signal intended for the device throughout the entire coverage area. It also has no way of knowing that the device actually received the broadcast message. According to the present invention, however, the response packet 18 is transmitted and broadcasted through the base station 10 which originally received the ARP 7, thereby reducing the processing burden on the network 12. Once reprogrammed, the device 5 can provide notification that it has been reprogrammed.

If the device 5 does not receive the response packet 18 within, for example, two minutes, the device 5 will re-send the ARP 7. If, for example, three attempts to receive the response packet 18 fail, the device 5 will inform the user via the output device 19. If the activation response packet 18 has been received by the device 5, then it is decrypted. If the GNA and the MSN fields of the response packet 18 match corresponding fields of the device 5, then the UNA, which is stored in the field 24 of the response packet 18, is copied into the location 3 of the memory storage unit 13 of the communication device 5. This can be preformed, for example, by writing the UNA into nonvolatile protected memory, such as Flash PROM or EEPROM, once the UNA is properly decoded.

After the UNA is loaded over-the-air into the communication device 5, the device 5 restarts and sends, via the wireless modem 11 an encrypted message to the wireless network 12 informing the network 2 that the device 5 is "BORN", i.e. operational. The network 12 then registers the message and updates its database of operational devices 5. Subsequently, the network 12 sends to the device 5 a welcome message confirming its operational status. In the "welcome" message, the service provider 16 may include information which, for example, has confirmation and welcome messages from the service provider 16. Accordingly, the device 5 is now activated.

Eliminating the need for manufacturers to insert the UNA into the location 3 for every device 5 during the assembly process due to the use of the GNA reduces the cost of manufacturing which also translates to a lower cost of the device 5.

Utilization of the GNA is an advantage of the present invention over existing systems. According to the present invention, a communication device 5 is pre-programmed with a common GNA during the manufacturing process. The use of a common GNA eliminates the need for allocating, at the time of manufacture, a UNA for every device 5 that may, for example, be placed in inventory for an extended period of time. Also, as a manufacturer may produce communication devices 5 for service providers 16 in various countries with each country having its own UNA assignments, without the use of a GNA in each device 5 according to the present invention, the manufacturer would have to assign a UNA for each communication device 5 based on, for example, a projection of the need for devices in each country. Such an arrangement, as exists in the prior art, can present a distribution problem, for example, if actual requirements for each country vary from the manufacturer's projections, thus resulting in manual UNA reprogramming of the communication devices or non-use of assigned UNAs. Further, without the use of GNA according to the present invention, even within a particular country, the use of pre-assigned UNAs limits the ability to allocate, for example, groups of sequential UNAs to, for example, a particular service provider as the pre-assignment of UNAs by manufacturer ties the allocation of the UNAs to particular communication devices 5 and not to the activation of the device 5. Thus, utilizing a GNA preserves and optimally utilizes the limited UNA pool 15. Additionally, recovery of the UNA from deactivated devices 5 can be significantly expedited. This can be performed by assigning the UNA of a deactivated device to a new device. If the old, deactivated device tries to communicate, the network will realize that the UNA is no longer assigned to the device because the serial number and UNA pair are no longer valid. Therefore, the network sends the device a message that prohibits further communication from the now deactivated device.

The method according to the present invention is also advantageous because it not only makes the OAA process available for the device 5, it also simplifies the activation process for the user of the communication device 5. For example, the device 5 can be activated and registered within, for example, two minutes compared to 45 minutes for conventional wireless communication systems. According to the present invention, for example, users will not have to fill out subscription forms or place calls to a customer service organization for activation. The entire OAA process is automated and requires no human intervention. In addition, the present invention allows the service provider 16, by sending a specific command (or by using a combination of events) over-the-air, in the same manner as the activation process, to quickly and efficiently disable the device 5 if, for example, the device 5 has been lost or is being used by an unauthorized user. Accordingly, the present invention significantly reduces the cost of activation or deactivation of the communication devices by eliminating the human resources,and manual effort required to activate, deactivate or modify the communication devices.

Another advantage of the present invention is a capability to provide on-line help and service information. The present invention allows the user to have instant access to help and service information from the service provider gateway 14 during the OAA process.

In addition to the OAA process, the present invention allows the user to change, over-the-air, available service for the device 5. For example, once the device 5 is activated, it operates in the user's mode. The user can, however, follow steps that are substantially similar steps to the steps during the OAA process to effect further changes in service. The user, for example, may change a service level, area of coverage, or frequency band. Also when the user desires to deactivate the device 5, the steps of deactivation are generally similar to the steps of the OAA process. During the deactivation process, the UNA is removed from the location 3 of the memory unit 13 and returned to the UNA pool 15, and the network 12 updates CAM 17 database and sends, for example, a "DIE" message to the device 5.

The billing process for a wireless communication system is also simplified and more flexible according to the present invention. The present invention allows the user to select, as part of the authorization request process, different levels of services during the OAA process. The service provider 16 can also associate a block of UNAs with a particular service level and thus allow the network provider to activate a specific UNA for the requested service. Under such a scheme, the billing process is simplified for the service provider 16 since the UNAs can be allocated for services rather than to device manufactures.

One exemplary use of the present invention is in a car tracking device. The car tracking device can be similar to the device 5, except it is installed in a car and has only an automated mode which, for example, is pre-programmed at the time of assembly of the tracking device. Further, the tracking device, unlike the device 5, does not need the output device 19 or the input device 20. Instead, the tracking device incorporates, for example, a GPS system, which is capable of determining a geographical location of the car.

The tracking device can be preprogramed to initiate contact with the wireless network 12 at predetermined tracking intervals, for example once a month. The tracking device transmits a message which is substantially similar to the ARP 7 and includes information such as the MSN and the GNA of the tracking device as well as the GPS information. Upon receiving the message, the wireless network 12 decrypts the MSN field and the GNA field, and compares them to the information stored in the wireless network 12 database. For example, if the car is supposed to be located in a defined geographical area, such as metropolitan New York City or New England, the car's actual location can be determined via the GPS data. If the car is not in the proper area, then an alarm can be activated, for example, to indicate that the location of the car needs to be investigated. The network 12 could then route a message to a predetermined party that tracks the geographical location of the car.

An advantage of the present invention, which is also embodied in the car tracking device set forth above, is that the tracking device does not utilize a UNA. Instead, a tracking device can utilize the GNA which can also be used for all tracking devices. As described, the identity of the car is determined upon looking at the MSN and the GNA combination.

What is claimed is:

1. A wireless communication system, comprising:

a network including a base station and a gateway;

wherein the base station forwards an activation request message from a communication device to the gateway via the network, the communication device generating the activation request message for providing a generic network address, the generic network address including a common network address that is the same as another generic network address of at least another communication device, and if service to the communication device is to be provided by the network, the gateway responds to the activation request message and provides an activation response message to the communication device via the network, the activation response message including a unique network address to be stored in the communication device.

2. A wireless communication system, comprising:

a network including a base station and a gateway;

wherein the base station forwards a first request message from a communication device to the gateway via the network, the communication device generating the first request message for providing one of a generic network address and a unique network address, and if service to the communication device is to be provided or changed by the network, the gateway responds to the first request message and provides a first response message to the communication device via the network, and wherein if the first request message includes the generic network address, then the first response message includes the unique network address to be stored in the communication device, and if the first request message includes the unique network address, then the first response message includes the generic network address to be stored in the communication device.

3. A wireless communication device, comprising:

a radio modem including a scanning circuit;

a control circuit coupled to the radio modem;

an input device coupled to the control circuit;

an output device coupled to the control circuit; and a memory storage unit coupled to the control circuit, the memory storage unit being preprogrammed with a generic network address;

wherein the generic network address comprises a common network address, the common network address being the same as another generic network address of at least another wireless communication device used to eliminate the need for allocating the unique network address when the wireless communication device is manufactured and different than a serial number of the wireless communication device.

4. A wireless communication system, comprising:

a network including a base station and a gateway;

wherein the base station forwards an activation request message from a communication device to the gateway via the network, the communication device generating the activation request message for providing a generic network address, and if service to the communication device is to be provided by the network, the gateway responds to the activation request message and provides an activation response message to the communication device via the network, the activation response message including a unique network address to be stored in the communication device, and wherein the activation request message includes a manufacturer serial number of the communication device, the generic network address of the communication device, customer information, a node number and a base station number.

5. The wireless communication system according to claim 1, wherein the activation request message is encrypted using a first encryption system.

6. The wireless communication system according to claim 1, wherein the activation request message is transmitted to the network when an activation process is initiated without a request by the network.

7. The wireless communication system according to claim 4, wherein the customer information is encrypted using a second encryption system.

8. The wireless communication system according to claim 4, wherein the activation response message includes the manufacturer serial number of the communication device, the generic network address of the communication device, the node number, the base station number and the unique network address.

9. The wireless communication system according to claim 1, wherein the activation response message is encrypted using a third encryption system.

10. A wireless communication system, comprising:

a network including a base station and a gateway;

wherein the base station forwards an activation request message from a communication device to the gateway via the network, the communication device generating the activation request message for providing a generic network address, and if service to the communication device is to be provided by the network, the gateway responds to the activation request message and provides an activation response message to the communication device via the network, the activation response message including a unique network address to be stored in the communication device, and wherein the base station adds a base station number and a node number of the activation request message.

11. A wireless communication system, comprising:

a network including a base station and a gateway;

wherein the base station forwards an activation request message from a communication device to the gateway via the network, the communication device generating the activation request message for providing a generic network address, and if service to the communication device is to be provided by the network, the gateway responds to the activation request message and provides an activation response message to the communication device via the network, the activation response message including a unique network address to be stored in the communication device, and wherein a manufacturer serial number, a base station number and a node number in the activation request message are copied to the activation response message.

12. A wireless communication system, comprising:

a network including a base station and a gateway;

wherein the base station forwards an activation request message from a communication device to the gateway via the network, the communication device generating the activation request message for providing a generic network address, and if service to the communication device is to be provided by the network, the gateway responds to the activation request message and provides an activation response message to the communication device via the network, the activation response message including a unique network address to be stored in the communication device, and wherein the activation response message is transmitted to the communication device as a function of a base station number and a node number.

13. The method according to claim 1, wherein the communication device is a tracking device.

14. The wireless communication device according to claim 3, wherein the communication device includes one of a beeper, a wireless phone, a wireless modem and a computer.

15. The wireless communication device according to claim 3, wherein the communication device is a tracking device, the tracking device including a position location system.

16. The wireless communication device according to claim 3, wherein the communication device is a tracking device, the tracking device including a GPS system.

17. The wireless communication device according to claim 3, wherein the communication device is contained in a vehicle.

18. The wireless communication device according to claim 3, wherein the communication device is contained in a mobile unit.

19. A wireless communication device, comprising:

a radio modem including a scanning circuit;

a control circuit coupled to the radio modem;

an input device coupled to the control circuit;

an output device coupled to the control circuit; and being a memory storage unit coupled to the control circuit, the memory storage unit being preprogrammed with a generic network address, wherein the communication device provides, as a first unsolicited step of an activation procedure, an activation request message to a gateway via a network, the activation request message including a manufacturing serial number of the communication device, the generic network address, and customer information, and wherein, if a service to the communication device is to be provided by the network, the gateway responds to the activation request message and provides an activation response message to the communication device via the network, the activation response message including a unique network address to be store din the memory storage unit.

20. A method comprising the steps of:

receiving a first request message by a gateway from a communication device via a network, the communication device generating the first request message which includes one of a generic network address and a unique network address;

if a service to the communication device is to be provided or changed by the network, responding to the first request message by providing a first response message from the gateway to the communication device via the network;

if the first request message includes the generic network address, inserting the unique network address to be stored in the communication device into the first response message; and if the first request message includes the unique network address, inserting the generic network address to be stored in the communication device into the first response message.

21. The wireless communication system according to claim 1, wherein the generic network address eliminates the need for allocating the unique network address when the communication device is manufactured.

22. The wireless communication system according to claim 1, wherein the generic network address of the communication device is different than a serial number of the communication device.

23. The wireless communication system according to claim 1, wherein the generic network address of the communication device is:

a common network address, the common network address being the same as another generic network address of at least another communication device;

used to eliminate the need for allocating the unique network address when the communication device is manufactured; and different than a serial number of the communication device.

24. The wireless communication device according to claim 3, wherein the control circuit uses the generic network address to form an activation request message for providing the generic network address to a gateway connected to a network.

25. The wireless communication device according to claim 24, wherein the generic network address eliminates the need for allocating the unique network address when the wireless communication device is manufactured.

26. The wireless communication device according to claim 3, wherein the generic network address of the wireless communication device is different than a serial number of the communication device.

\* \* \* \* \*

UNITED STATES PATENT AND TRADEMARK OFFICE
CERTIFICATE OF CORRECTION

PATENT NO. : 6,636,489 B1
DATED : October 21, 2003
INVENTOR(S) : Fingerhut It is certified that error appears in the above-identified patent and that said Letters Patent is hereby corrected as shown below:

Column 10,
Line 38, "being a memory storage unit" should read -- a memory storage unit --
Line 53, "to be store din the memory" should read -- to be stored in the memory --

Signed and Sealed this

Seventh Day of September, 2004

JON W. DUDAS
*Director of the United States Patent and Trademark Office*